United States Patent
Haumayr et al.

(10) Patent No.: US 11,230,232 B2
(45) Date of Patent: Jan. 25, 2022

(54) MOTOR VEHICLE COMPRISING A SCREEN IN A PASSENGER COMPARTMENT

(71) Applicant: Bayerische Motoren Werke Aktiengesellschaft, Munich (DE)

(72) Inventors: Werner Haumayr, Neuried (DE); Richard Kastner-Puschl, Munich (DE); Victor Kuehn, Munich (DE); Ulla Staudacher, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 7 days.

(21) Appl. No.: 16/420,411

(22) Filed: May 23, 2019

(65) Prior Publication Data

US 2019/0275955 A1    Sep. 12, 2019

Related U.S. Application Data

(63) Continuation of application No. PCT/EP2017/081971, filed on Dec. 8, 2017.

(30) Foreign Application Priority Data

Dec. 21, 2016   (DE) .................... 10 2016 225 745.5

(51) Int. Cl.
*B60R 11/02* (2006.01)
*B60R 11/00* (2006.01)
*B60R 1/00* (2006.01)

(52) U.S. Cl.
CPC .......... *B60R 11/0235* (2013.01); *B60R 11/00* (2013.01); *B60R 1/00* (2013.01); *B60R 2011/0028* (2013.01); *B60R 2011/0082* (2013.01); *B60R 2011/0085* (2013.01); *B60R 2300/207* (2013.01)

(58) Field of Classification Search
CPC .................................................. B60R 11/0235
USPC ......................................................... 428/174
See application file for complete search history.

(56) References Cited

U.S. PATENT DOCUMENTS

| 6,352,300 B1 * | 3/2002 | Beal ......................... B60J 7/223 296/180.1 |
| 2002/0113451 A1 | 8/2002 | Chang |
| 2010/0163697 A1 | 7/2010 | Ikunami |
| 2012/0055966 A1 | 3/2012 | Abe et al. |
| 2015/0097389 A1 * | 4/2015 | Dryselius ............ G02F 1/13306 296/96.19 |

(Continued)

FOREIGN PATENT DOCUMENTS

| CN | 201158346 Y | 12/2008 |
| CN | 201169231 Y * | 12/2008 |

(Continued)

OTHER PUBLICATIONS

Translation of CN201169231 (Y) (Wei) (Year: 2008).*

(Continued)

*Primary Examiner* — Brent T O'Hern
(74) *Attorney, Agent, or Firm* — Crowell & Moring LLP

(57) ABSTRACT

A motor vehicle has a screen which is arranged and secured in the region of an inner face of the vehicle roof in a passenger compartment. The screen extends continuously across at least half the width, preferably at least two thirds of the width, in particular substantially across the entire width, of the inner face of the vehicle roof.

17 Claims, 3 Drawing Sheets

(56) References Cited

U.S. PATENT DOCUMENTS

2016/0250969 A1    9/2016  Nania

FOREIGN PATENT DOCUMENTS

| CN | 203118396 U | 8/2013 |
|---|---|---|
| CN | 203644363 U | 6/2014 |
| DE | 102 26 406 C1 | 12/2003 |
| DE | 11 2008 001 538 T5 | 4/2010 |
| DE | 20 2016 100 609 U1 | 5/2016 |
| EP | 2 857 239 A1 | 4/2015 |
| JP | 2002-193045 A | 7/2002 |
| WO | WO 98/39176 A1 | 9/1998 |
| WO | WO 2008/086109 A2 | 7/2008 |

OTHER PUBLICATIONS

International Search Report (PCT/ISA/210) issued in PCT Application No. PCT/EP2017/081971 dated Feb. 12, 2018 with English translation (five pages).

German-language Written Opinion (PCT/ISA/237) issued in PCT Application No. PCT/EP2017/081971 dated Feb. 12, 2018 (six pages).

German-language Search Report issued in counterpart German Application No. 10 2016 225 745.5 dated Nov. 15, 2017 with partial English translation (12 pages).

English translation of Chinese-language Office Action issued in Chinese Application No. 201780066077.0 dated Oct. 20, 2021 (eight (8) pages).

\* cited by examiner

MOTOR VEHICLE COMPRISING A SCREEN IN A PASSENGER COMPARTMENT

CROSS REFERENCE TO RELATED APPLICATIONS

This application is a continuation of PCT International Application No. PCT/EP2017/081971, filed Dec. 8, 2017, which claims priority under 35 U.S.C. § 119 from German Patent Application No. 10 2016 225 745.5, filed Dec. 21, 2016, the entire disclosures of which are herein expressly incorporated by reference.

BACKGROUND AND SUMMARY OF THE INVENTION

The present invention relates to a motor vehicle, in particular a passenger vehicle, having a screen which is arranged and secured in a passenger compartment in a region of an inner side of a vehicle roof.

It is known in a motor vehicle to mount a display on a roof in a state associated with a seat. Such a display device has a comparatively small size and has a conventional aspect ratio of, for example, 4:3 or 16:9. In a passenger vehicle with two seats on a bench type rear seat, two such display devices are accordingly required. The quantity of information content and entertainment content which can be displayed is in this instance relatively small.

DE 11 2008 001 538 T5 discloses, for example, such a closable display device which can be mounted on a vehicle roof and which can be pivoted between an operating position, that is to say, a folded-down position, and a non-operating position, that is to say, a position folded upward in the direction of the vehicle roof.

An object of the present invention is to provide a motor vehicle with a screen in a passenger compartment, which screen is arranged in the region of a vehicle roof inner side, can be used in a versatile manner, and can reproduce or display a relatively large amount of information and entertainment content.

According to the invention, a motor vehicle has a screen which is arranged and secured in a passenger compartment in the region of a vehicle roof inner side. The screen extends continuously over at least half, preferably at least two-thirds, of the width, in particular substantially an entire width, of the vehicle roof inner side.

Preferably, the screen extends in the width direction continuously at least from a center of a driver seat to a center of a passenger seat, wherein the screen is arranged behind the driver seat and the passenger seat.

A screen may also be referred to as a display and is a display device for displaying information content and/or entertainment content. A "continuous screen" is intended to be understood to be a screen which does not comprise several components or portions, but instead which visually forms one unit and is undivided. A vehicle roof inner side extends in a transverse direction generally from a right roof side frame to a left roof side frame. The vehicle roof inner side is generally formed by a roof liner or also completely or at least partially by a sunroof. The passenger compartment may also be referred to as a passenger space. The term "motor vehicle" is intended in particular to be understood to be a passenger motor vehicle which, for example, has two or more seat rows, wherein each seat row generally has two or more seats.

As a result of the spatial expansion of the screen in the transverse vehicle direction over at least half of the width of the vehicle roof inner side, a large amount of content can be displayed so as to be able to be easily read or identified on the screen for a vehicle passenger or for vehicle passengers sitting beside each other.

According to a preferred development, the screen has a maximum height of 400 mm. Preferably, the screen may further have a maximum height of 300 mm. Advantageously, the screen has a minimum height of 100 mm or a minimum height of 150 mm.

As a result of a relatively small height in comparison with the width of the screen, the screen limits the field of vision of the vehicle passenger sitting in front of the screen to a relatively small extent in the forward direction so that the vehicle passenger at the same time can see a traffic incident, for example, through a front window of the motor vehicle, and can see the content on the screen. Furthermore, as a result of the small height, the screen limits a feeling of the vehicle passenger being in a constricted space only to a small extent, and the screen also does not actually constitute a considerable limitation of the vehicle inner space.

Preferably, the screen has a width of at least 500 mm, at least 600 mm, at least 700 mm, at least 800 mm, at least 900 mm, at least 1000 mm, at least 1,100 mm or at least 1,200 mm.

Consequently, contents for two vehicle passengers sitting beside each other in front of the screen can be displayed on a single screen. This conveys the impression of a panorama for the vehicle occupant.

The screen may also be constructed in such a manner that from different viewing angles, for example, from a vehicle passenger sitting at the right-hand side (a right-hand seating position) and a vehicle passenger sitting at a left-hand side (a left-hand seating position), different contents which are displayed at the same time are visible.

It is thereby possible to display different contents at the same time over an entire width of the screen for different seating positions.

According to a preferred development, the screen is constructed so as to be able to be positioned in such a manner that, in a field of vision of a vehicle passenger sitting in front of the screen, a lower edge of the screen is substantially in alignment with an upper end of a front window. That is to say, the vehicle occupant can both observe in a manner unimpeded by the screen a traffic incident in front of the vehicle through the front window and read and identify contents on the screen above the upper end of the front window.

Where applicable in this instance, on the screen it is possible to reproduce what (that is to say, the environment) is concealed by the vehicle roof. In other words, the screen which is folded downward does not limit the view through the front window since visibility toward the lower edge of the screen is approximately aligned with the upper end of the front window.

The screen is advantageously pivotably supported about a real or virtual pivot axle which extends in the transverse vehicle direction, that is to say, in a Y direction in the vehicle coordinate system. The pivot axle may be constructed to be fixed or so as to be positionally variable.

In this instance, the screen may advantageously be pivotable into a roof position, in which the screen is positioned substantially parallel with the vehicle roof inner side.

As a result of the pivotability, on the one hand, the screen may be able to be pivoted into a position which is advantageous for the vehicle passenger and in which the passenger can see content on the screen particularly well and, on the other hand, the screen can be pivoted completely into the roof position in which the screen does not limit the passenger compartment and the field of vision for the vehicle passenger in a forward direction is not limited by the screen.

The screen may be pivotably supported by way of a single-link mechanism or by way of a multi-link mechanism, for example, a four-link mechanism.

Preferably, the pivotable screen may be constructed to be curved, wherein the curvature of the screen in the roof position substantially corresponds to a curvature of the vehicle roof inner side.

The curvature may, on the one hand, be used for better legibility in a pivoted-down position of the screen, that is to say, an operating position, and, on the other hand, enable an elegant adaptation of the screen to the vehicle roof inner side in the roof position thereof, wherein the screen can be pivoted as close as possible to the vehicle roof inner side and headroom in the roof position of the screen is limited to the smallest possible extent.

Additionally or alternatively, the screen may be displaceably supported in a longitudinal vehicle direction, that is to say, in an x direction of the vehicle coordinate system.

The screen can also thereby be displaced into a position which is advantageous for the vehicle passenger so that the vehicle passenger can identify content on the screen as well as possible.

It is further also possible to displace the screen into a position in which the screen where applicable does not limit the inner space.

Furthermore, it is also possible to move the screen, for example, from a position in front of a rear seat row into a position in front of a front seat row so that the screen can be used for different seat rows which are arranged one behind the other.

According to a preferred development, the screen is in particular exclusively secured and supported on a left roof side frame and on a right roof side frame.

A particularly durable and stable support of the screen is thereby possible. Furthermore, as a result of the lateral support and where applicable without further central support, that is to say, by means of exclusively lateral support, the screen can thereby visually convey an elegant free-floating impression.

In the case of the displaceability of the screen, there can be formed or secured on the roof side frame rails slotted members or the like, by means of which the screen is displaceably supported in the longitudinal vehicle direction.

According to another preferred development of the present invention, the screen is constructed to be transparent, that is to say, substantially clear.

The screen thereby does not limit a field of vision of the vehicle passenger in a forward direction, wherein at the same time content can be incorporated into this field of vision. Such a transparent screen is, for example, constructed by use of organic LEDs, that is to say, OLED.

Using organic LEDs, the screen can be constructed to be relatively thin and also transparent.

Preferably, the screen is constructed without a frame, wherein the screen provides an elegant effect and no frame limits the field of vision of the vehicle passenger and a size of a display region of the screen can be constructed to be at a maximum.

According to another advantageous development, the screen is arranged in a vehicle rear, that is to say, in front of a rear seat row, that is to say, a seat row which is not the foremost seat row.

The screen is pivotably supported in such a manner that the front side thereof, that is to say, the side which in the operating position faces the vehicle passenger sitting in front, that is to say, the viewing vehicle passenger, in the roof position, faces the passenger compartment.

Content on the screen can thereby also be seen in the passenger compartment in the roof position.

Furthermore, the screen may be constructed in such a manner that content can be displayed at both sides of the screen.

That is to say, both sides of the screen, a front side which is, for example, a main reproduction side, and a rear side, have display regions (reproduction regions). This is particularly advantageous when the screen with the main reproduction side which the vehicle passenger sees in the pivoted-down state can be pivoted in the direction of the vehicle roof inner side. In this instance, in the roof position, additional content can be displayed. This content may, for example, also be purely a graphic embellishment of the vehicle roof inner side. The screen could also be arranged between two opposing seat rows so that vehicle passengers on both seat rows can see content.

The screen may further be constructed in the roof position as an inner space illumination. In this instance, an illumination intensity and a color of the inner space illumination may be adjustable.

The screen may further be constructed in such a manner that, in the event that it is constructed to be transparent, it may be able to darken and consequently act as sun protection or the like.

The screen may also contain a mirror function, which enables the vehicle passenger to see him/herself on the screen. The mirror function may be implemented by means of a camera whose image is displayed on the screen.

According to a preferred embodiment, the screen is inherently stiff. That is to say, the screen is constructed to be rigid per se and not bendable in use. As long as the screen is pivotably supported, it can be pivoted as a whole. For example, the screen is consequently constructed not to be able to be rolled up.

The above-mentioned developments and additional features of the invention may be freely combined with each other as long as this is possible and advantageous.

Other objects, advantages and novel features of the present invention will become apparent from the following detailed description of one or more preferred embodiments when considered in conjunction with the accompanying drawings.

DETAILED DESCRIPTION OF THE DRAWINGS

A detailed description of an embodiment of the present invention with reference to the Figures follows.

Figure 1:
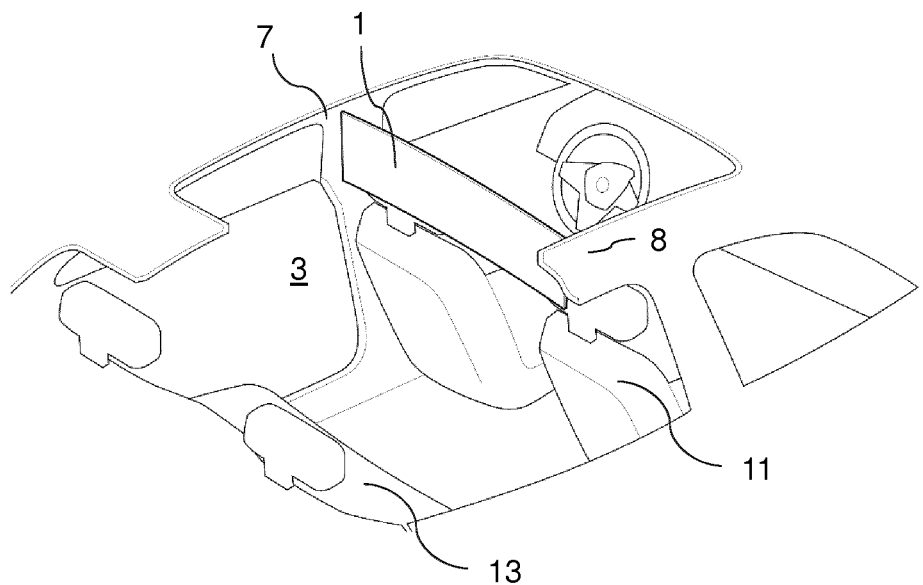
FIG. 1 is a schematic, perspective view of a passenger compartment with a pivotable screen in a folded-down position according to an embodiment of the present invention.

FIG. 1 illustrates a passenger vehicle with a passenger compartment 3 as a sectioned view with a perspective obliquely from above at the rear. The passenger vehicle has a front seat row 11 with a driver seat and a passenger seat and a rear having a rear seat row 13 in the form of a bench type rear seat 13 with two or three seats. A screen 1 is pivotably supported at a left roof side frame 7 and a right roof side frame 8. The screen 1 extends substantially across an entire width of an inner side 5 of a vehicle roof between the left roof side frame 7 and the right roof side frame 8. The screen 1 is in this instance constructed integrally, that is to say, it extends in an undivided manner over the entire width thereof and is not composed of a plurality of screen portions. The screen 1 may be pivoted into a main operating position (main display position) in which the screen 1 is orientated substantially in a vertical direction and a person seated on the bench type rear seat 13, that is to say, a rear vehicle passenger, can see content on a front side of the screen 1, that is to say, a side of the screen 1 facing the rear vehicle passenger. Furthermore, the screen 1 can be pivoted into a roof position in which the screen 1 is pivoted substantially parallel with a vehicle roof inner side 5, wherein the front side of the screen 1 faces the passenger compartment 3, that is to say, also the rear vehicle passenger. In FIG. 1, the screen 1 is illustrated in the folded-down position, that is to say, the mentioned main operating position.

Figure 2:
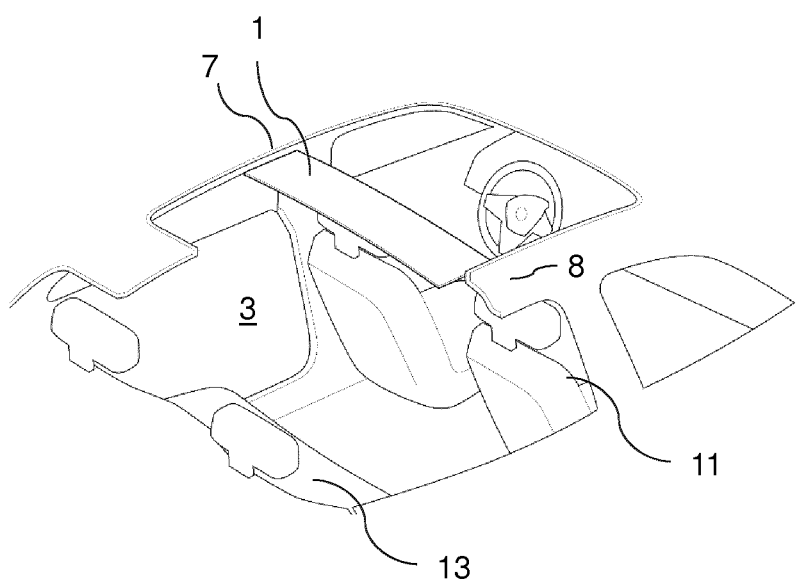
FIG. 2 is a schematic, perspective view of the passenger compartment with the screen in a folded-up position according to the embodiment of the present invention.

In FIG. 2, the passenger motor vehicle is illustrated with the passenger compartment 3 as a sectioned view with a perspective obliquely from above at the rear, wherein the screen 1 is in a folded-up position, that is to say, the above-mentioned roof position.

Figure 3:
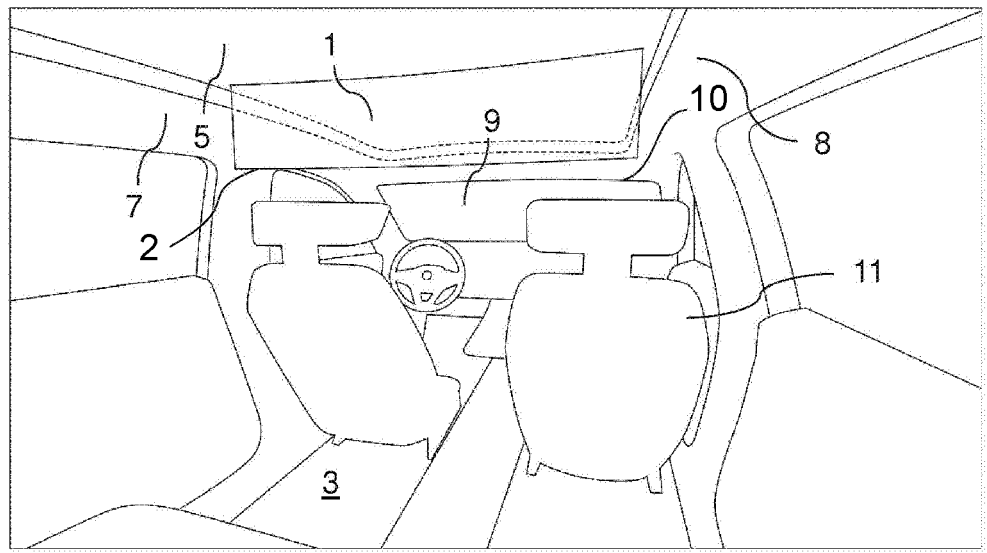
FIG. 3 is a schematic, perspective view from a perspective of a rear seat passenger with the screen in the folded-down position according to the embodiment of the present invention.

FIG. 3 shows the vehicle inner space 3 with the screen 1 in the main operating position thereof approximately from a perspective of the rear vehicle passenger, that is to say, the vehicle passenger seated on the bench type rear seat 13. A field of vision of the rear vehicle passenger on the bench type rear seat 13 is directed substantially forward, wherein the passenger, where applicable in a manner limited by front seats of the front seat row 11 or front passengers, also has a view toward the front window 9. From the perspective of the rear vehicle passenger, a lower edge 2 of the screen 1 is approximately in alignment with an upper end 10 of the front window 9 so that the screen 1 does not impede a field of vision of the rear vehicle passenger toward the front window 9. Where applicable, this can be adjusted by further pivoting the screen 1 or by means of a longitudinally displaceable support, that is to say, a displaceability in the longitudinal vehicle direction, which is also referred to in the vehicle coordinate system as the X direction, of the screen 1. In FIG. 3, by means of a broken line, portions of the vehicle roof inner side which are covered by the screen are shown.

Figure 4:
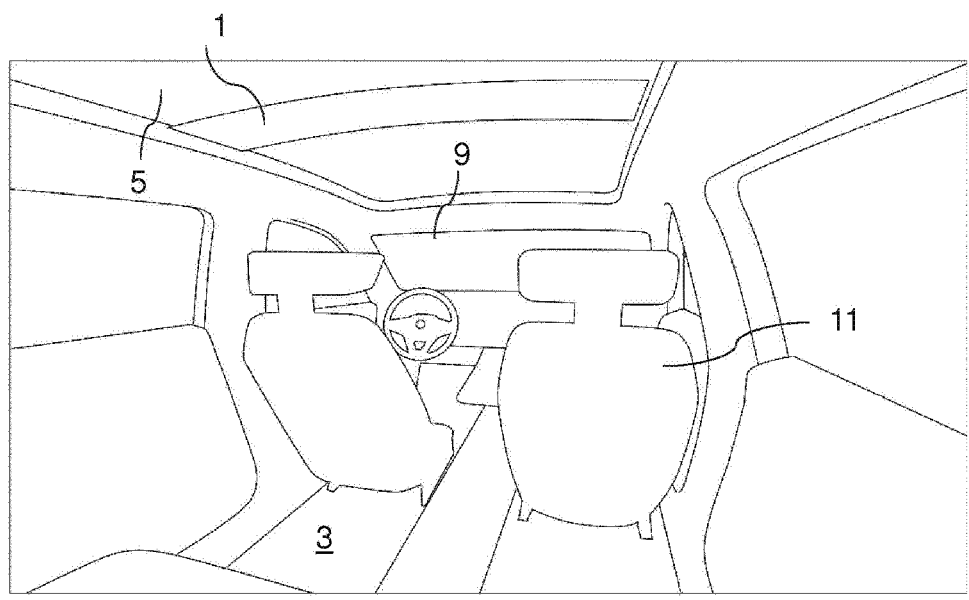
FIG. 4 is a schematic, perspective view from the perspective of the rear seat passenger with the screen in the folded-up position according to the embodiment of the present invention.

FIG. 4 shows the same perspective as FIG. 3, wherein the screen 1 is in the roof position.

Figure 5:
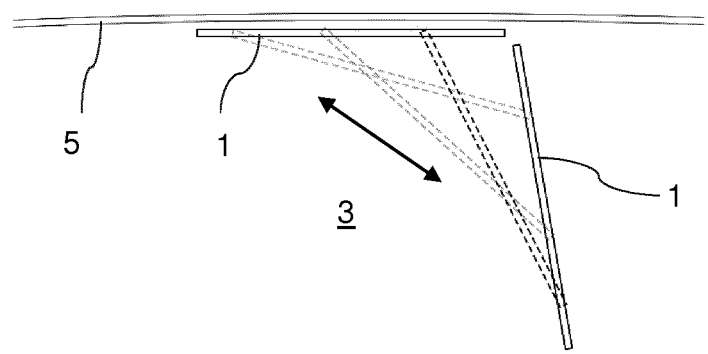
FIG. 5 is a schematic side view of the screen according to the embodiment of the present invention, wherein the screen is illustrated in different pivot positions.

The screen 1 is pivotably supported on the left roof side frame 7 and the right roof side frame 8 by way of a multi-link mechanism, in particular a four-link mechanism, which is not shown but which is known per se. In FIG. 5, a corresponding pivot movement of the screen 1 is shown as a side view. As a result of the multi-link mechanism, the screen 1 can be pivoted about a virtual pivot axis or in a virtual pivot path in such a manner that the screen 1 during the pivot movement does not collide with the rear vehicle passengers.

As can be seen in FIGS. 1 to 4, in particular in FIG. 3, the screen 1 has, in relation to the width thereof, a relatively small height, wherein the height thereof is substantially in a range from 100 to 300 mm dependent on the vehicle type or passenger compartment configuration. As a result of the relatively small height of the screen 1, the above-described view of the rear vehicle passenger toward the front window 9 is not limited. Furthermore, the screen 1 thereby limits the space in the vehicle rear to a relatively small extent. With regard to a width, the screen 1 extends at least from a center of the driver seat to a center of the passenger seat. Depending on the construction type of the vehicle, the screen may have a width of at least 500 mm, at least 600 mm, at least 700 mm, at least 800 mm, at least 900 mm or at least 1000 mm. A maximum width is predetermined by a width of the vehicle roof inner side. In the embodiment shown in the figures, the screen has almost this maximum width.

Any information content and entertainment content can be displayed on the screen 1. In this case, the content which can be displayed may be completely independent of the vehicle, for example, television, Internet content or films, or also relate to the current vehicle state or the vehicle. Map content, navigation content, environmental information, for example, tourist information, weather information, can be displayed. The screen may also be constructed in an interactive manner so that via the screen 1, by way of an input device, inputs/controls are possible. The screen 1 can also be used for video telephony. Furthermore, the screen 1 can be used to transmit images from cameras of the vehicle, for example, a camera which is directed in the vehicle travel direction. The screen 1 further has a mode in which rear vehicle passengers seated beside each other on the bench type rear seat 11 can be shown different contents on a left half and a right half of the screen 1.

The screen 1 is further constructed in such a manner that it can also display content in the roof position thereof. The contents which the rear vehicle passenger can see in the roof position may also be information or entertainment content; it may also be simply graphic contents which change or improve an appearance of the passenger compartment. In the roof position, the screen 1 can also be used purely as a light source with freely selectable light colors and so as to be able to be dimmed in terms of illumination intensity. In this instance, a so-called ambient animation could also be displayed, whereby in the passenger compartment a desired interior space ambience can be produced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   a screen which is arranged and secured in a passenger compartment in a region of an inner side of a vehicle roof, wherein
   the screen extends continuously over at least half of a width of the inner side of the vehicle roof,
   the screen is mounted in the region of the inner side of the vehicle roof between a front window of the motor vehicle and a vehicle seat so as not to limit a field of vision through the front window of a passenger on the vehicle seat viewing the screen.

2. The motor vehicle as claimed in claim 1, wherein the screen extends over at least two-thirds of the width of the inner side of the vehicle roof.

3. The motor vehicle as claimed in claim 1, wherein the screen extends over substantially an entirety of the width of the inner side of the vehicle roof.

4. The motor vehicle as claimed in claim 1, wherein the screen is positionable such that, in the field of vision of the passenger sitting in front of the screen, a lower edge of the screen is substantially in alignment with an upper end of a front window.

5. The motor vehicle as claimed in claim 4, wherein the screen has a maximum height of 400 mm and a minimum height of 100 mm.

6. The motor vehicle as claimed in claim 4, wherein the screen has a maximum height of 300 mm and a minimum height of 150 mm.

7. The motor vehicle as claimed in claim 5, wherein the screen has a width of at least 500 mm.

8. The motor vehicle as claimed in claim 5, wherein the screen has a width of at least 800 mm.

9. The motor vehicle as claimed in claim 5, wherein the screen has a width of at least 1000 mm.

10. The motor vehicle as claimed in claim 1, wherein the screen is supported so as to be displaceable in a longitudinal vehicle direction.

11. A motor vehicle, comprising:
a screen which is arranged and secured in a passenger compartment in a region of an inner side of a vehicle roof, wherein
the screen extends continuously over at least half of a width of the inner side of the vehicle roof,
the screen is pivotably supported about a real or virtual pivot axis which is fixed or which is positionally variable and which extends in a transverse vehicle direction, and
the screen is pivotable into a roof position in which the screen is positioned substantially parallel with the inner side of the vehicle roof.

12. The motor vehicle as claimed in claim 1, wherein the screen is transparent.

13. The motor vehicle as claimed in claim 1, wherein the screen is an organic light emitting diode (LED) screen.

14. The motor vehicle as claimed in claim 1, wherein the screen is constructed to be not bendable in use.

15. The motor vehicle as claimed in claim 11, wherein the screen is secured and supported on a left roof side frame and on a right roof side frame.

16. The motor vehicle as claimed in claim 11, wherein the screen is curved, and
a curvature of the screen in the roof position substantially corresponds to a curvature of the inner side of the vehicle roof.

17. A motor vehicle, comprising:
a display device for displaying information content and/or entertainment content which is arranged and secured in a passenger compartment in a region of an inner side of a vehicle roof, wherein
the display device extends continuously over at least half of a width of the inner side of the vehicle roof, and is pivotably supported about a real or virtual pivot axis which is fixed or which is positionally variable and which extends in a transverse vehicle direction.

* * * * *